United States Patent [19]
VerNooy

[11] 3,755,908
[45] Sept. 4, 1973

[54] PIPELINE PIG
[75] Inventor: Burton VerNooy, Tulsa, Okla.
[73] Assignee: T. D. Williamson, Inc., Tulsa, Okla.
[22] Filed: Jan. 13, 1971
[21] Appl. No.: 106,194

[52] U.S. Cl.............................. 33/178 F, 33/174 R
[51] Int. Cl...... E21b 47/08, G01b 5/12, G01b 5/20
[58] Field of Search ...................... 33/174 R, 174 L, 33/174 M, 175, 178 F, 147 L, 302, 76; 73/151; 138/97

[56] References Cited
UNITED STATES PATENTS
| 2,933,819 | 4/1960 | Kinley | 33/178 F |
|---|---|---|---|
| 2,502,775 | 4/1950 | Brandon | 33/178 F |
| 3,503,424 | 3/1970 | Sawyer | 138/97 |
| 3,561,490 | 2/1971 | Little | 138/97 |

Primary Examiner—Robert B. Hull
Assistant Examiner—Richard R. Stearns
Attorney—Hyer, Eickenroht, Thompson & Turner

[57] ABSTRACT

A pipeline caliper pig is disclosed which can be passed through a pipeline to provide indications of or a record of deviations of the inner pipeline wall from a normal configuration as such deviations may occur along the pipeline. The pig employs a resiliently outwardly biased circumferential portion which slides along the inner wall of the pipeline so that segments of such portion move laterally in conformity with such a deviation and caliper means are provided which sense these lateral movements by a plurality of sensors so that substantially full-circle coverage of the inner pipeline wall is afforded with a limited number of sensors. Also, these sensors are isolated from the pipeline wall by the circumferential portion of the pig and are not subjected to the stresses and wear involved in maintaining sliding contact with the pipeline wall. The arrangement can be such that only the net change in pipe diameter is indicated.

10 Claims, 5 Drawing Figures

Patented Sept. 4, 1973   3,755,908

INVENTOR.
BURTON VerNOOY
BY Nye, Eickenright,
Thompson & Lerner
ATTORNEYS

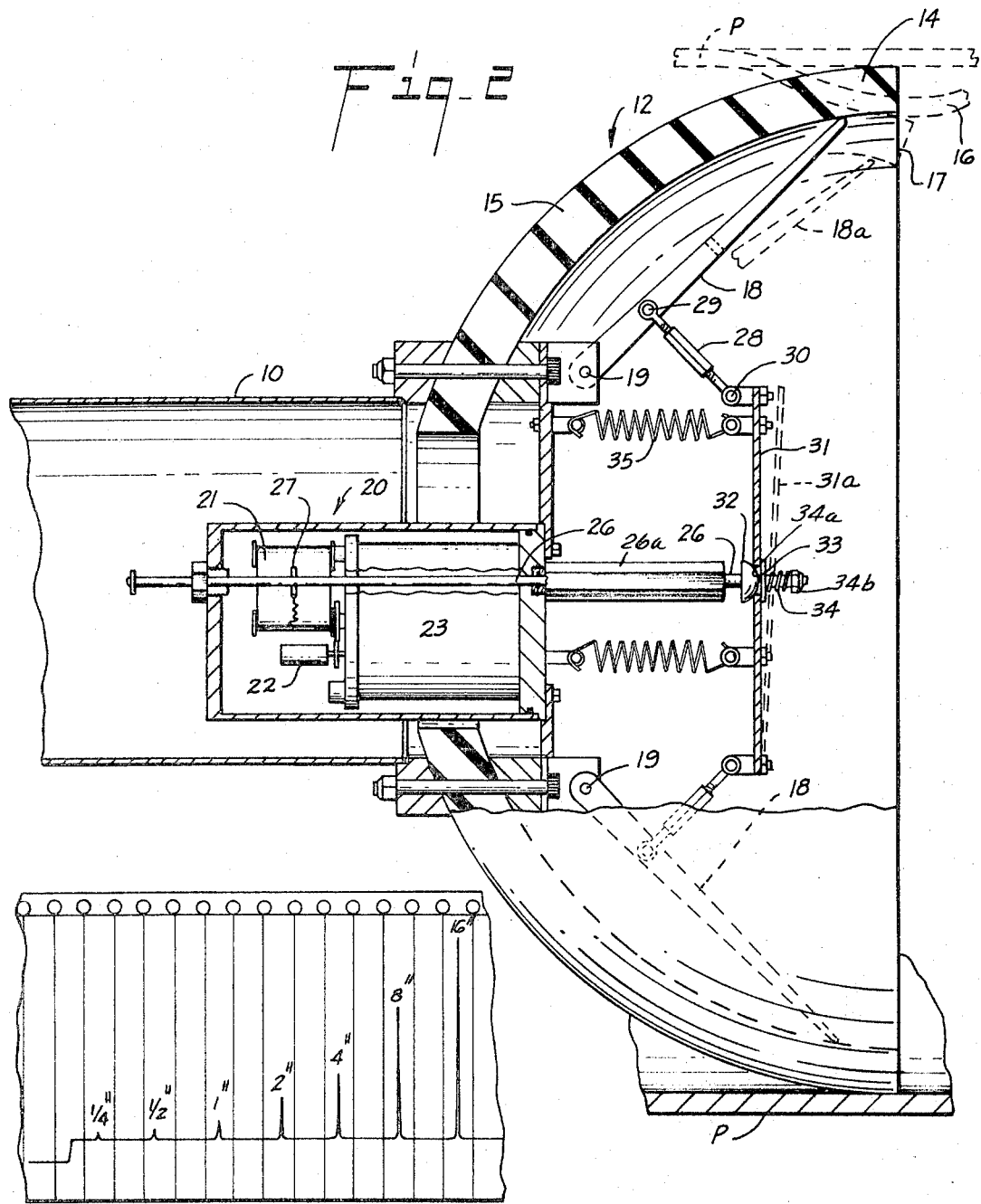

PIPELINE PIG

This invention relates to a pipeline caliper pig for providing indications of deviations of an inner wall of a pipeline from a nominal cross-sectional configuration.

The internal calipering of long lengths of buried pipeline may be desirable for several reasons. The primary reason for this type of inspection is to locate and repair sections of a pipeline which might be hazardous to safe operation. For example, a pipeline may be damaged as it is laid, especially during the backfill operation, so that it may have serious dents, out-of-round sections, etc. The damaged areas can cause a flow restriction which in some cases will stop or damage standard pigs or they may cause stress concentration points which could fail.

This type of inspection is also desirable to locate areas damaged during line operation. Pipelines at river crossings or other underwater locations are especially subject to such damage.

The particular environment involved in providing a mechanism to internally caliper a pipeline presents several problems. For example, the mechanism should be capable of continuously traversing long lengths of line (frequently measured in many tens of miles) without excessive wear which would either cause it to fail or to give spurious indications of the internal configuration of the pipeline. It should also give full-circle coverage of the inner wall without becoming unduly complicated or employing an excessive number of parts. It should be able to pass through curved portions of the pipe of normal cross-sectional configuration without indicating a departure from such normal configuration. It should be able to pass side openings (e.g., a tee joint), valves, etc., without being damaged.

It is therefore an object of this invention to provide a pipeline caliper pig which solves these problems and which can be propelled along the pipeline by fluid flowing through the pipeline so that the pig is a self-contained unit capable of calipering over great distances and detecting deviations in inner pipe wall configurations as they may occur from place to place along the pipeline.

Another object is to provide such a pig in which a circumferential portion is resiliently biased outwardly into substantially full-circle and sliding engagement with the inner wall of the pipeline in such a manner that a localized dent or other disconformity will cause a segment or part of the portion to move laterally with such movement being sensed by a sensor whereby a limited number of sensors can be used to effectively obtain full-circle coverage of the pipeline.

Another object is to provide such a pig in which the sensors' output is integrated so that movement of the pig out of coaxial alignment with the pipeline, as may be the case when a large dent occurs in one side of the pipeline, or a change in its angular attitude with respect to the pipeline, as when traversing a bend, does not produce an erroneous indication of the condition of the pipeline.

Another object is to provide such a pig in which the sensors are not frictionally engaged with the pipeline wall nor are they subjected to any stresses incurred by the pig in maintaining its circumferential portion in sliding engagement with the pipe wall.

Other objects, advantages and features of the invention will be apparent to one skilled in the art upon studying the specification and drawings wherein:

FIG. 4 shows a tape on which is representations of a trace showing dents of various magnitudes; and FIG. 5 illustrates another embodiment and one which is particularly adapted for bi-directional operation.

In accordance with this invention, a pipeline caliper pig is provided which has, as a part thereof, an annular portion resiliently biased outwardly to be in sliding engagement with the inner wall of the pipeline. Then when the pig moves past a deviation of the inner wall, such as a dent, part of the annular portion is moved laterally and sensing means are employed to sense such movement to provide an indication of the deviation. The annular portion is arranged so that it provides substantially full-circle coverage of the inner wall of the pipeline and is mounted on the pig body so that the stresses involved in sliding it along and in contact with the pipeline wall are not transmitted to the sensing means. Also, the sensing means are maintained out of contact with the pipeline wall by having the annular portion disposed between the wall and the sensing means so that the latter are actually sensing deviations in the contour of the annular portion albeit these are generated by deviations in the pipeline wall. This overall arrangement permits the use of a limited number of sensing means while still obtaining full-circle coverage, permits the sensing means to be protected from excessive stresses and wear as would be the case if they were in direct contact with the pipeline wall whereby they can be made to be relatively sensitive, and permits the annular portion to be made from a rugged material adapted to withstand the wear and stresses involved in maintaining sliding contact with a pipeline wall over long distances.

The calipering arrangement also preferably includes an integrating device for summing the extent of movement of diametrically opposite sensing means so that when they sense movement of the annular portion in equal amounts but in opposite directions, as when the pig traverses a bend or an ell, the output is zero thereby avoiding a spurious indication of a deviation. Also if the pig encounters a deviation on one side of the pipeline which causes the pig to move sideways out of axial alignment with the pipeline, the output of the sensor nearest the dent will be less than that indicative of the depth of the dent but an opposite sensor will then have an output proportional to the sideways movement of the pig and by summing the two, the result will be a true indication of the depth of the dent or the minimum diameter of the line at the dent.

Figure 1:
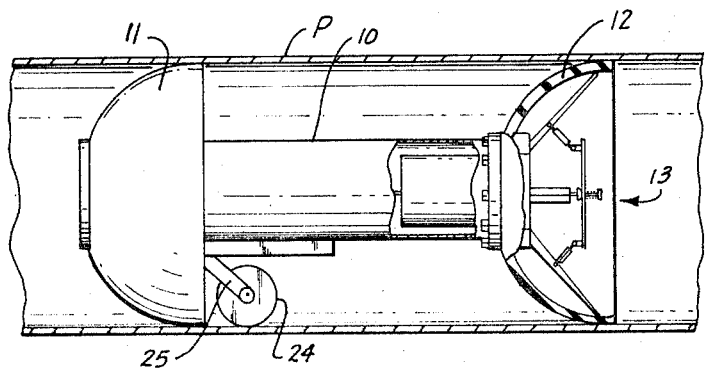
FIG. 1 illustrates a preferred embodiment of the invention with the caliper pig disposed in a pipeline and having portions broken away and in section to better illustrate the arrangement.

Referring to the drawings, particularly to FIG. 1, there is shown a pig body assembly disposed in a pipeline P. The assembly includes a central body 10 and means for supporting the body in the pipeline and for impeding flow of pipeline fluid past the pig so that the pig is propelled by such fluid along the pipeline. Such means is here illustrated as including a pair of hollow hemispherical cups 11 and 12 which have an outer diameter at their trailing edges when in a relaxed condition, i.e., before inserting into the pipeline, which is somewhat greater than the inner diameter of the pipeline. As shown in FIG. 1, the calipering means 13 is provided within the rear most cup 12.

Figure 2:
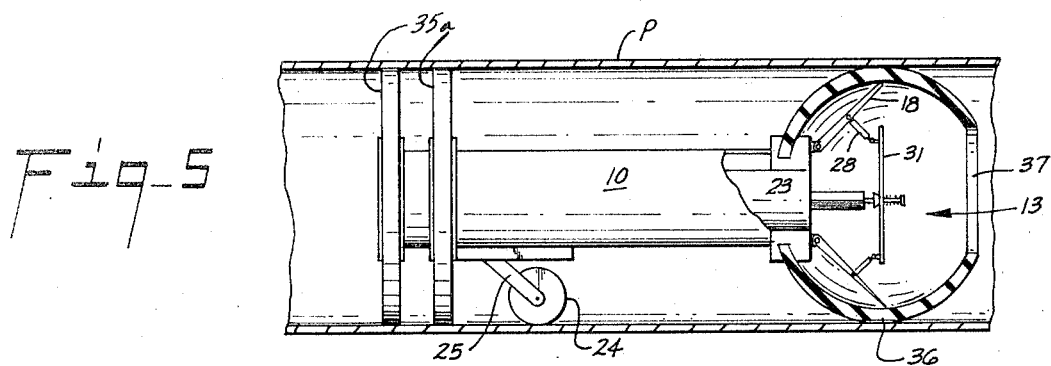
FIG. 2 is a cross-sectional view of the rear end of the caliper pig shown in FIG. 1 with only two of the feeler arms and associated linkages being shown for the sake of clarity.
Figure 3:
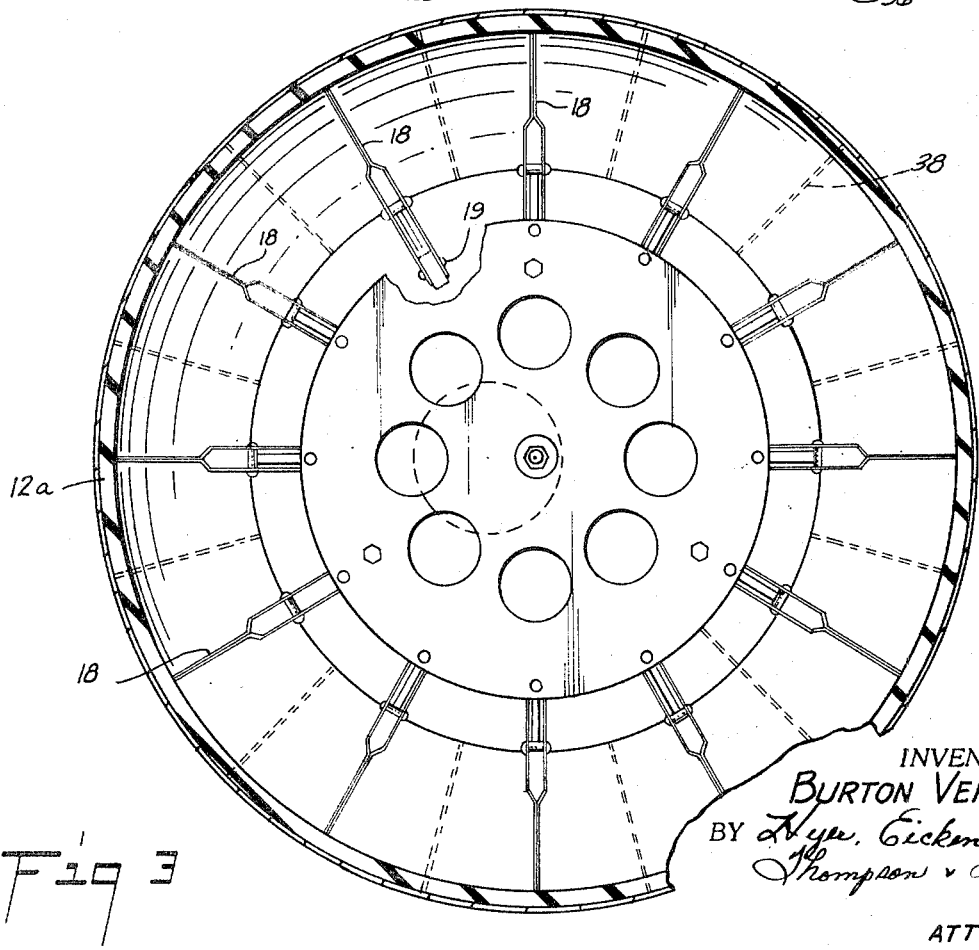
FIG. 3 is a rear elevational view of the pig of FIG. 1.

Referring to FIGS. 2 and 3, the rear cup 12 is shown as having an annular or circumferential portion 14 which is in sliding engagement with the inner wall of the pipeline throughout substantially the entire inner periphery of the latter. This circumferential portion is joined to the pig body by another portion 15. It is also resiliently biased outwardly into sliding engagement with the pipeline wall but is yieldable inwardly so that when a pig passes a deviation, as for example, a dent as shown in dashed outline at 16, a part or segment of the annular or circumferential portion in the vicinity of the dent will move inwardly as at 17. Conversely, since the cup was collapsed slightly inwardly when the pig was inserted into the pipeline, that part of the annular portion which encounters a side opening can flex outwardly into the opening.

The caliper means as illustrated includes a plurality of feeler arms 18 spaced circumferentially about the pig body and pivotally connected thereto as by pivot pins 19. These arms extend so that their free ends contact the interior of circumferential portion 14 of cup 12 and the arrangement is such that as this circumferential portion or a segment thereof flexes inwardly and outwardly, the arms will follow such flexing and pivot about the respective pins 19. Such pivoting, which is indicative of a deviation of the inner wall of a pipeline from a nominal cross-sectional configuration, is transmitted by a suitable linkage means, described in detail below, to a recording means 2o. The recording means includes a suitable recording medium, such as a strip chart 21 which may, for example, be driven by a stepper motor 22 in increments representative of the distance travelled by the pig through the pipeline. For example, the chart can be stepped 1/1000 inch per foot of travel of the pig through the pipeline. The circuitry for controlling the stepper motor together with a suitable power supply can be situated as at 23. This circuitry is preferably arranged to step the motor each time odometer wheel 24 revolves one revolution. The odometer wheel may have a permanent magnet embedded in one of its side faces so that it causes actuation of a reed switch located in arm 25 each time the wheel 24 completes one revolution. The arm 25 is pivoted to the pig body and is resiliently biased outwardly to hold the wheel 24 in rolling engagement with the inner wall of the pipeline. Further details on this arrangement are shown in a patent application entitled "Pipeline Pig" filed on Oct. 12, 1970 as Ser. No. 79,808, and reference is made to such application for further description of the arrangement which is incorporated herein by reference.

The recording means also includes a shaft 26 mounted therein for longitudinal movement relative to the pig body. The shaft carries a stylus 27. As shown the shaft extends through a housing 26a therefor and terminates in a thread on its outer end onto which nut 34b is screwed.

Linkage means are provided linking the various feeler arms 18 to shaft 26 so that when one or more of the arms are pivoted responsive to the pig passing a deviation, shaft 26 and stylus 27 are moved to make a suitable record of the deviation on the strip chart. Preferably the linkage means include an integrating means which integrates or sums the amount of movement of diametrically opposed feeler arms. This permits the measurement of the true minimum inside diameter of the pipeline even when the pig is off-center and prevents the recording of a spurious signal as when the pig goes around a sharp bend.

The linkage means includes a turnbuckle 28 for each of the feeler arms and each turnbuckle is pivoted at 29 to its respective feeler arm and at 30 to integrator plate 31. The integrator plate has a universal connection with shaft 26 so that the plate can wobble with respect to the shaft. This universal connection is illustrated as being provided by a semi-spherical abutment 32 carried by shaft 26 and engaging the plate around the edges of an opening 33 therein. The plate is maintained in contact with the abutment by spring 34 surrounding shaft 26 and having one end engaging a washer 34a and the other end engaging a nut 34b threaded to shaft 26. With this construction, it will be seen that with spring 33 in compression, it will act against washer 34a to urge it against plate 31 thereby urging plate 31 against abutment 32.

Means are also provided for resiliently biasing the feeler arms 18 outwardly into contact with the annular or circumferential portion 14. As shown, this can comprise three tension springs 35 extending between the integrator plate 31 and the pig housing. Thus springs 35 tend to pull plate 31 toward the pig body thereby tending to cause the turnbuckles to transmit force to the feeler arms to urge them outwardly.

With the foregoing arrangement, it will be seen that while the pig is traversing the pipeline of normal cross-section, the feeler arms will be as shown in the full line position and the record on the chart 21 will be a straight line. However, should the pig encounter a dent, such as at 16, the part of the circumferential portion 14 at the dent will be flexed inwardly as at 17. This causes the feeler arm at the location of such flexure to move inwardly as at 18a. This causes plate 31 to be moved to the position shown in dashed outline at 31a thereby moving shaft 26 to cause the stylus to record a "blip" on the recording medium. During this movement, the part of circumferential portion 14 diametrically opposite from the dent remains in normal engagement with the pipeline wall so that the feeler arm in engagement with this part does not move. Therefore plate 31 will tilt about the pivotal connection of the lower feeler arm with the plate and all of the other feeler arms will be, in various degrees, either moved out of contact with the peripheral portion 14 or to a lesser degree of contact and thus the angularity of the plate is determined by the diametrically opposed feeler arms. As a result, the movement of shaft 26 is a measurement of the net change in diameter of the pipeline at the point of the greatest restriction. When the dent is of substantial circumferential extent, several of the feeler arms adjacent the dent may be simultaneously moved inwardly but the extent of movement of shaft 26 is still determined by the feeler arm which moves inwardly to the greatest extent and its diametrical counterpart. Should the dent be such that the pig moves off center, the feeler arm at the dent and its diametrical counterpart will both move inwardly and plate 31 will sum these movements to give a true indication of the depth of the dent.

When the caliper pig encounters an out-of-round portion of the pipeline, the feeler arms located on the minimum diameter will be moved simultaneously inwardly to govern the extent of movement of shaft 26.

Should the pig move past a side opening, circumferential portion 14 which lies across the side opening will move outwardly due to the cup having been initially compressed somewhat when the pig was inserted into the pipeline.

Referring to FIG. 4, there is shown an example of trace showing the record of dents of various depths in large diameter pipeline, such as a 36 inch pipe. It will be noted that the instrument is sensitive to very small diameter changes and yet can still measure and record large diameter changes. This is due to the geometry of the caliper mechanism (length and angle of the arms) and by varying this, various degrees of relative sensitivity can be achieved.

Referring to FIG. 5, another embodiment of the invention is shown. In this embodiment the caliper pig can be moved in either direction and hence is said to be bi-directional. This form differs from that of FIGS. 1-3 in that the front cup has been replaced by a pair of circular resilient "cups" 35a and the rear cup by a hollow sphere 36 which has an access hole 37 cut in one end through which the caliper means can be inserted and removed.

The circumferential portion 14 or the entirety of cups 12 and 36 are preferably made from a material having the elastic and wear resistant properties of polyurethane. The material should be sufficiently resilient or elastic that it can sense or be temporarily deformed by relatively small local deviations in the pipe wall without causing the pig body to be radially displaced out of co-axial alignment with the pipeline. The resiliency should preferably be great enough that a given diameter of cup can accommodate a range of pipe sizes such as all sizes in a range of 30 to 36 inch pipe without changing cups and merely by changing caliper arms. On the other hand, the cups should be stiff enough, when they also serve to impede flow past the pig, that they will not be inverted or "flipped" by the pressure differential across the pig. In this connection, it is not necessary that the circumferential portion 14 be provided as a part of a cup. Separate cups can be used to provide the supporting and flow impeding functions and portion 14 can be provided as a separate structure. For example, an annular ring of material could be used and this could be connected to the pig body by suitable means such as by leaf springs. Also, although portion 14 is preferably unitary, it can be segmented as indicated by the dashed lines 38 in FIG. 3. When so constructed, each segment 12a can move inwardly independently of the others if the dent is limited in extend to the sector covered by one segment. The width of the segments should be such that substantially full-circle coverage is obtained. However, such segmental construction is less preferred than the unitary construction because no hoop stresses are generated to keep the portion 14 in contact with the pipe wall and this detracts from the pig body supporting function of the cup. Also, a third cup is then very desirable so as to provide spaced seals to assist the pig in moving past side openings.

From the foregoing description of one embodiment of this invention by way of example, it will be seen that this invention is one well adapted to attain all of the ends and objects hereinabove set forth, together with other advantages which are obvious and which are inherent to the apparatus and structure.

The invention having been described, what is claimed is:

1. A pipeline caliper pig for measuring the deviations of an inner wall of a pipeline from a nominal cross-sectional configuration, comprising, in combination: a pig body assembly having a central body and means for supporting the central body in a pipeline and for impeding flow of pipeline fluid past the pig so that the pig is propelled by such fluid along the pipeline; said pig body assembly also having a circumferential ring-shaped portion resiliently biased outwardly for sliding engagement with substantially the entire periphery of the inner pipeline wall and constructed so that at least one circumferential segment thereof moves laterally of the central body when a deviation of an inner wall of a pipeline is encountered by such segment; and caliper means carried by the pig body assembly including a plurality of sensing means for respectively responding to lateral movement of one of the circumferential segments of said circumferential portion for providing indications of such deviations.

2. The caliper pig of claim 1 wherein said circumferential portion is provided by a unitary ring of resilient material so that said circumferential segments are joined together.

3. The pipeline caliper pig of claim 1 wherein said circumferential portion is provided by a plurality of individual arcuate segments having their ends spaced closely together so that they together give substantially full-circle coverage of the inside wall of the pipeline.

4. The caliper pig of claim 1 wherein said circumferential portion is provided by a pig cup of resilient material which also helps support the pig body in the pipeline, said cup having a circumferential part for sliding engagement with the inner wall of the pipeline and being temporarily distortable inwardly and outwardly responsive to said deviations.

5. A pipeline caliper pig for measuring the deviations of an inner wall of a pipeline from a nominal cross-sectional configuration, comprising, in combination, a pig body assembly having a central body and means for supporting the central body in a pipeline and for impeding flow of pipeline fluid past the pig so that the pig is propelled by such fluid along the pipeline; said pig body assembly also having a circumferential portion resiliently biased outwardly for sliding engagement with substantially the entire periphery of the inner pipeline wall and constructed so that at least one circumferential segment thereof moves laterally of the central body when a deviation of an inner wall of a pipeline is encountered by such segment; and caliper means carried by the central body including a plurality of feeler arms pivoted to the central body and each extending outwardly to engage one of said circumferential segments with the latter being between the pipe wall and said feeler arms so that each feeler arm is sensitive to the pipe configuration along the entire circumferential extent of its respective segment whereby a limited number of feeler arms may effectively sense the entire inner periphery of the pipeline, means for providing an indication of deviations sensed by said arms and their respective segments, and linkage means for connecting the feeler arms to the last-mentioned means.

6. The caliper pig of claim 5 wherein said linkage means includes a plate movable longitudinally of the pig body and to which all of the feeler arms are pivotally connected at points of equal radius from the center of the plate whereby when diametrically opposed feeler arms respectively sense equal inward and outward movements of their segments, the center of the plate does not move longitudinally, said indication means being connected to be sensitive to longitudinal movements of the plate at its center.

7. The caliper pig of claim 6 wherein said indication means includes a shaft movable longitudinally of the pig body, and a universal connection between said shaft and said plate at its center so that said plate can wobble relative to said shaft as different feeler arms move inwardly.

8. A pipeline caliper pig for measuring deviations of an inner wall of a pipeline from a nominal cross-sectional configuration, comprising, in combination: a pig body assembly having a central body and means for supporting the central body in a pipeline and for impeding flow of pipeline fluid past the pig so that the pig is propelled along the pipeline by fluid flowing therethrough; said assembly including a hollow pig cup of resilient material having an annular circumferential portion for slidingly engaging the inner pipeline wall and a resilient portion connecting said annular portion to the central body so that segments of the annular portion can flex inwardly and outwardly as they encounter said deviations; a plurality of circumferentially spaced feeler arms pivotally connected to the central body and extending outwardly to engage said annular cup portion at the inner side thereof, an indicator shaft carried by the central body for longitudinal movement to indicate a deviation of an inner wall of a pipeline when encountered by said cup, a plate having a universal connection with the shaft so that it can wobble with respect to the shaft; a link pivotally connecting each feeler arm to the plate at circumferentially spaced points equidistant from the connection of the shaft to the plate; and means biasing the feeler arms outwardly against said annular cup portion.

9. The caliper pig of claim 8 wherein said pig cup is a hollow hemisphere with the feeler arms mounted internally thereof.

10. The caliper pig of claim 8 wherein said cup is a hollow sphere with an access opening in a wall thereof opposite its attachment to the pig body.

* * * * *

REEXAMINATION CERTIFICATE (1821st)

United States Patent [19]

VerNooy

[11] B1 3,755,908

[45] Certificate Issued Oct. 27, 1992

[54] PIPELINE PIG

[75] Inventor: Burton VerNooy, Tulsa, Okla.

[73] Assignee: TDW Delaware, Inc.

Reexamination Request:
No. 90/002,157, Oct. 9, 1990

Reexamination Certificate for:
Patent No.: 3,755,908
Issued: Sep. 4, 1973
Appl. No.: 106,194
Filed: Jan. 13, 1971

[51] Int. Cl.⁵ .................. E21B 47/08; G01B 5/12; G01B 5/20
[52] U.S. Cl. .................. 33/544.3; 33/542
[58] Field of Search ............. 33/544, 544.1, 544.2, 33/544.3

[56] References Cited

U.S. PATENT DOCUMENTS

| | | | |
|---|---|---|---|
| 2,030,244 | 2/1963 | Cox | 33/544.3 |
| 2,502,775 | 4/1950 | Brandon | 33/544.3 |
| 2,518,663 | 8/1950 | Chaney et al. | 33/544 |
| 2,695,457 | 11/1954 | Robert | 33/544.3 |
| 2,896,332 | 7/1959 | Elston et al. | 33/544.3 |
| 3,195,236 | 7/1965 | Green et al. | 33/777 |

*Primary Examiner*—Thomas B. Will

[57] ABSTRACT

A pipeline caliper pig is disclosed which can be passed through a pipeline to provide indications of or a record of deviations of the inner pipeline wall from a normal configuration as such deviations may occur along the pipeline. The pig employs a resiliently outwardly biased circumferential portion which slides along the inner wall of the pipeline so that segments of such portion move laterally in conformity with such a deviation and caliper means are provided which sense these lateral movements by a plurality of sensors so that substantially full-circle coverage of the inner pipeline wall is afforded with a limited number of sensors. Also, these sensors are isolated from the pipeline wall by the circumferential portion of the pig and are not subjected to the stresses and wear involved in maintaining sliding contact with the pipeline wall. The arrangement can be such that only the net change in pipe diameter is indicated.

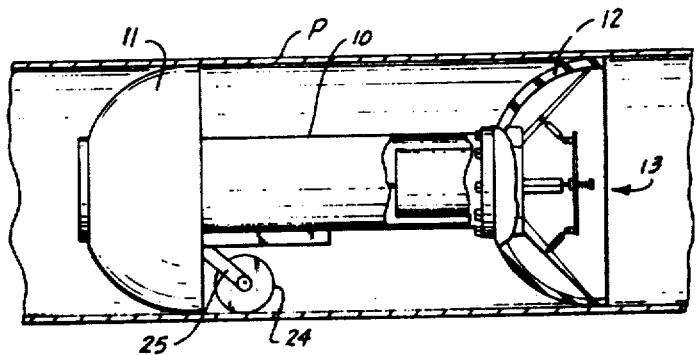

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-10 is confirmed.

* * * * *